United States Patent
Mousavi Hondori et al.

(10) Patent No.: US 11,453,965 B1
(45) Date of Patent: *Sep. 27, 2022

(54) SYSTEM AND METHOD FOR DETERMINING JOINDER LOCATIONS FOR ASSEMBLY OF GARMENTS

(71) Applicant: CreateMe Technologies LLC, New York, NY (US)

(72) Inventors: Hossein Mousavi Hondori, Mountain View, CA (US); Gopi Vinod Avvari, Dublin, CA (US); Weixin Yang, San Francisco, CA (US)

(73) Assignee: CreateMe Technologies LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,796

(22) Filed: Nov. 12, 2021

Related U.S. Application Data (63) Continuation of application No. 17/363,783, filed on Jun. 30, 2021, now Pat. No. 11,203,826.

(51) Int. Cl.

| | |
|---|---|
| *G06T 7/181* | (2017.01) |
| *D05B 19/12* | (2006.01) |
| *G06T 7/13* | (2017.01) |
| *G06T 7/00* | (2017.01) |
| *G06N 20/00* | (2019.01) |
| *D05B 69/20* | (2006.01) |

(52) U.S. Cl.
CPC ............. *D05B 19/12* (2013.01); *D05B 69/20* (2013.01); *G06N 20/00* (2019.01); *G06T 7/0004* (2013.01); *G06T 7/13* (2017.01); *G06T 7/181* (2017.01); *G06T 2207/30124* (2013.01)

(58) Field of Classification Search
CPC ......... G06T 7/181; G06T 7/13; G06T 7/0004; G06T 2207/30124; G06N 20/00
USPC .......... 382/100, 151, 155, 111; 700/130–139
See application file for complete search history.

(56) References Cited

U.S. PATENT DOCUMENTS

| | | | | |
|---|---|---|---|---|
| 6,154,884 | A * | 12/2000 | Dehner | A41D 13/02 2/82 |
| 6,854,146 | B2 * | 2/2005 | Stoyles | D06B 11/0059 700/133 |
| 8,955,447 | B1 * | 2/2015 | Miksch | D05B 19/12 112/475.19 |
| 11,203,826 | B1 * | 12/2021 | Mousavi Hondori | G06N 20/00 |
| 2019/0257015 | A1 * | 8/2019 | Harnett | H05K 1/00 |

* cited by examiner

*Primary Examiner* — Sheela C Chawan
(74) *Attorney, Agent, or Firm* — Shun Yao; Yao Legal Services, Inc.

(57) ABSTRACT

One embodiment can provide a system and method for determining joinder points on to-be-joined fabric pieces. During operation, the system captures an image comprising the to-be-joined fabric pieces; identifies to-be-joined edges, respectively, on the fabric pieces; for each edge, computes a curve that substantially fits the edge; and determines the joinder points on the edge based on the computed curve. Variance of distance between two consecutive joinder points on the edge is within a predetermined value.

20 Claims, 11 Drawing Sheets

SYSTEM AND METHOD FOR DETERMINING JOINDER LOCATIONS FOR ASSEMBLY OF GARMENTS

RELATED APPLICATION

This application is a continuation of U.S. application Ser. No. 17/363,783, entitled "SYSTEM AND METHOD FOR DETERMINING JOINDER LOCATIONS FOR ASSEMBLY OF GARMENTS," by inventors Hossein Mousavi Hondori, Gopi Vinod Avvari, and Weixin Yang, filed 30 Jun. 2021.

BACKGROUND

Field

This disclosure is generally related to automation in garment fabrication. More specifically, this disclosure is related to a system and method for determining joinder locations for attaching two pieces of fabric.

Related Art

Automation (e.g., the use of robotic systems) has been widely used and is transforming manufacturing in various industries (e.g., the automobile industry). However, even as the global demand for clothing has increased because of increased population, changes in consumer attitude toward fast fashion, and an increase in the average income in many countries, automation in garment manufacturing is still mainly focused on fabric production. The actual assembly of garments, which typically involves sewing operations, is still mostly dependent on skilled manual labor. The cost of sewing can be between 30% and 60% of the total cost of garment fabrication.

Increasing labor cost has become an important driving force of garment-assembly automation. Relatively simple sewing operations, such as sewing a button or a pocket, can be done by robots. More complicated sewing or fabric attachment operations that involve two fabric pieces having different lengths, contours or curvatures (e.g., attaching sleeves) remain challenging for robots.

SUMMARY

One embodiment can provide a system and method for determining joinder points on to-be-joined fabric pieces. During operation, the system captures an image comprising the to-be-joined fabric pieces; identifies to-be-joined edges, respectively, on the fabric pieces; for each edge, computes a curve that substantially fits the edge; and determines the joinder points on the edge based on the computed curve. Variance of distance between two consecutive joinder points on the edge is within a predetermined value.

In a variation on this embodiment, identifying the to-be-joined edges comprises inputting the captured image to a trained machine-learning model.

In a variation on this embodiment, computing a curve that substantially fits the edge comprises computing a spline based on a number of points on the identified edge.

In a further variation, computing the spline comprises: determining the number of points on the identified edge based on a predetermined spatial sampling rate, and computing the spline that traverses the determined number of points.

In a variation on this embodiment, determining the joinder points comprises computing a total length of the curve and a segment length between adjacent joinder points.

In a further variation, the joinder points are substantially evenly distributed along the curve, and the segment length is determined based on the total length of the curve and a predetermined number of the joinder points.

In a variation on this embodiment, the system outputs location information of the determined joinder points on each edge, thereby facilitating an automated joining operation on the fabric pieces.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of identifying locations of joinder points (e.g., stitch locations) that can be used in some applications as part of an automated garment fabrication process. When two pieces of fabric are to be joined, a computer-vision system can first identify points located on the to-be-joined edges of the fabric pieces. Based on these identified points, the computer-vision system can compute a spline to match the curve on each edge. Oversampling can optionally be used to achieve a smoother spline. To generate a joinder pattern with substantially equal spacing between joinder points, the system can divide each spline into the same number of segments. More specifically, the system can compute the total length of each spline and then evenly divide the total length into a predetermined number of segments. The endpoints of each segment on one piece of fabric and the corresponding endpoints on the other piece of fabric can be identified. The joinder points between the endpoints on one piece of fabric are mapped to the corresponding joinder points on the other piece of fabric, wherein the corresponding two joinder points are to be attached together, thus ensuring the two fabric pieces can be attached evenly, even when the edges of the two pieces of fabric have different contours or lengths. In addition to the evenly spaced stitch pattern, other designs with different segments of different spacing between joinder points can also be implemented using a similar technique.

Computer-Vision System for Automated Sewing

Figure 1:
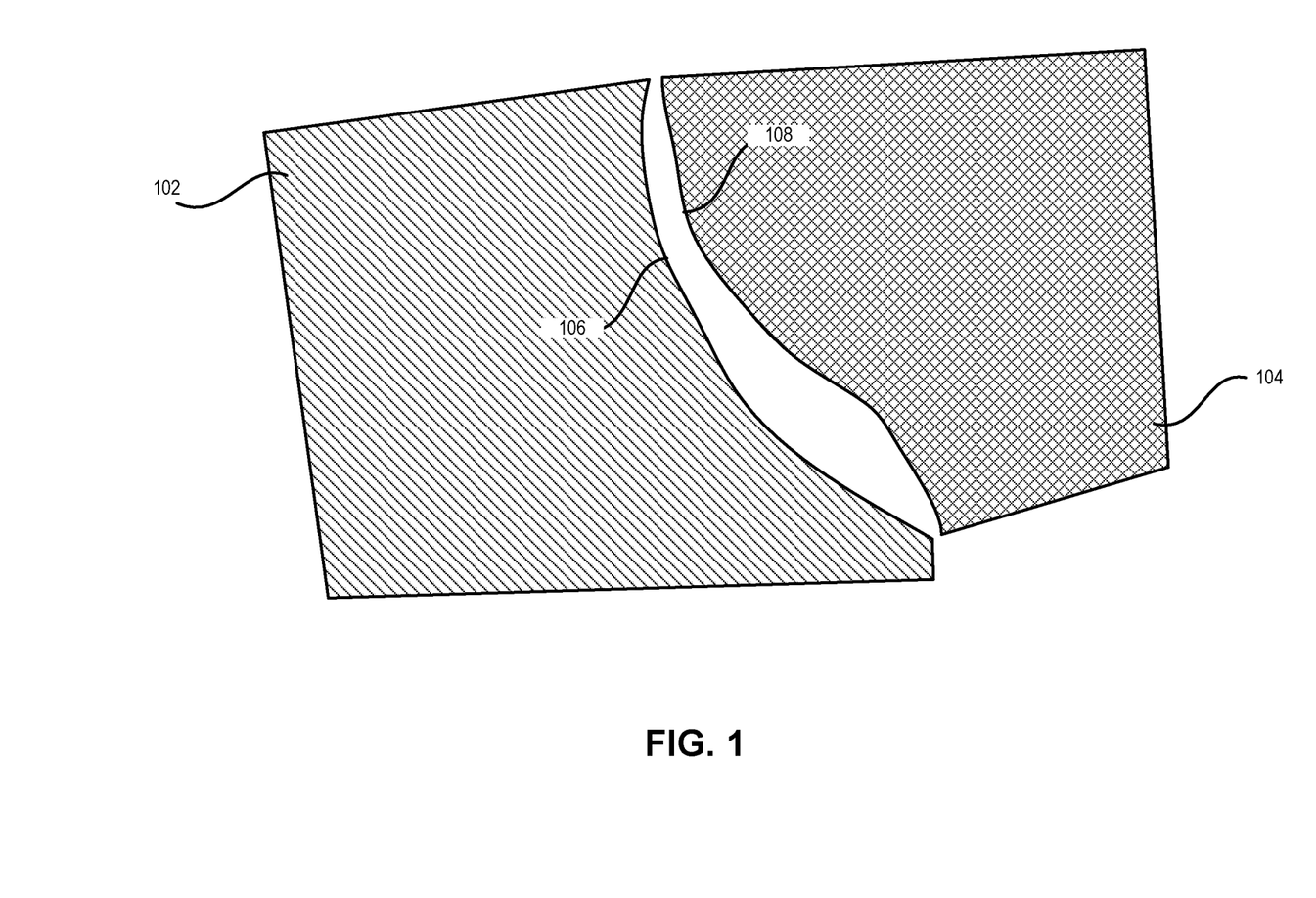
FIG. 1 illustrates exemplary fabric pieces that are to be made into a T-shirt.

FIG. 1 illustrates exemplary fabric pieces that are to be made into a T-shirt. More specifically, left-side fabric piece 102 is the front panel of the T-shirt and right-side fabric piece 104 is the sleeve of the T-shirt. FIG. 1 also shows that left-side fabric piece 102 has a curved edge 106 and right-side fabric piece 104 has a curved edge 108. When making the T-shirt, one needs to join (e.g., sew) edge 106 with edge 108. As one can see from FIG. 1, edges 106 and 108 have different curvatures and lengths. This is because the human body is a three-dimensional (3D) structure and the T-shirt is designed to provide a good fit to the 3D human body by joining pieces of fabric that are cut into two-dimensional (2D) patterns.

When the T-shirt is to be made manually, a human (e.g., a skilled seamstress) can sew fabric pieces 102 and 104 together. During sewing, the seamstress can line up edges 106 and 108 at their corresponding ends and use his or her real-time visual and haptic feedback to match and stitch the correct points on each edge together. For example, using a sewing machine, they can start from one end and, as they move to the other end, they can straighten and join about one inch of fabric from each side at a time and feed them under the presser foot of the sewing machine to stitch the fabric pieces together. By the time they reach the other end, the two fabric pieces are joined. During sewing, the seamstress can make constant adjustment (e.g., stretching one fabric piece while compressing the other piece) to match the length of the two pieces in order to achieve the desired effect. Such maneuvers can be hard to mimic in an automated setting. More specifically, it is challenging for a robot to locate the correct matching points (also referred to as the joinder points) on the two fabric pieces being joined, because the haptic feedback, real-time visual feedback, and dexterity of robots can be significantly inferior to humans.

In some embodiments, a computer-vision system can be used to automatically determine the joinder points on two to-be-joined fabric pieces. The corresponding joinder points on the two fabric pieces can function as fixed points to be attached together, while an automated joining process (such as an automated linear sewing process) can be used to join the edges between the joinder points. In this way, it is possible to create an automated joining process to join two fabric pieces with different contours and/or lengths. A garment created using an assembly process that is based on such pre-determined joinder points can have a seam that is fixed or attached together (e.g., "pinched") at such joinder points, and the part of the seam between two consecutive joinder points may be joined using a conventional fabric-joining method such as sewing. As a result, the mismatch of lengths, contour, shape, stretching, tension or other fabric property between two consecutive joinder points can be tolerated by the fabric-joining method, but does not accumulate along the seam, because such mismatch is reset at each joinder point. Note that embodiments of the present invention are not limited to any particular fabric-joining method and can apply to various methods, including but not limited to stitching, gluing, and fusing.

Figure 2:
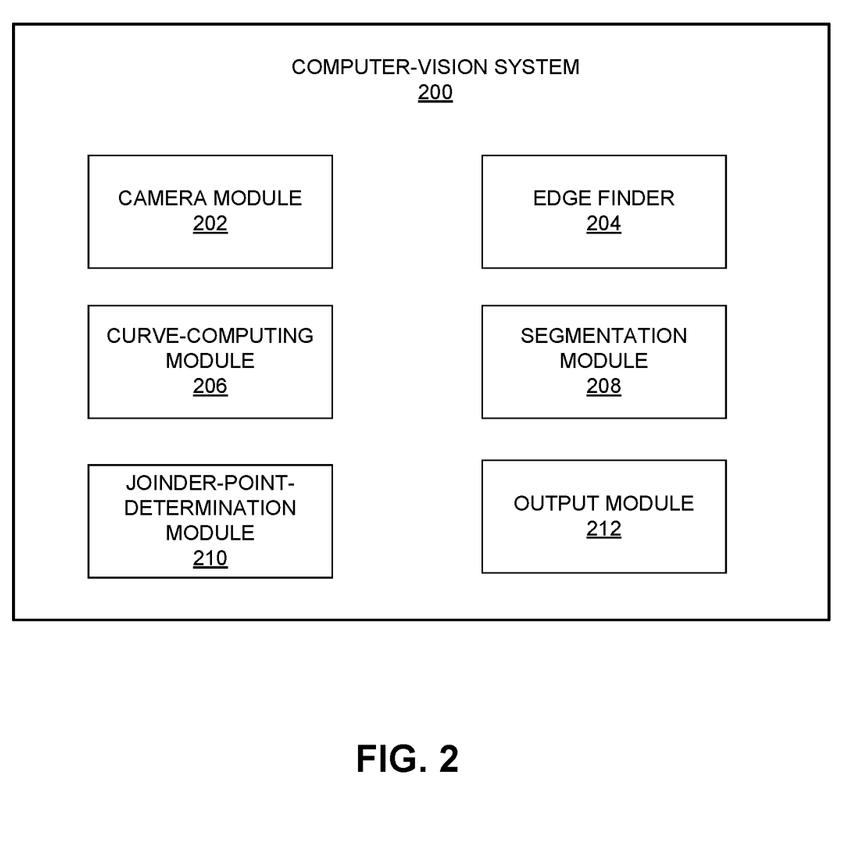
FIG. 2 illustrates an exemplary block diagram of a computer-vision system for determining joinder points on fabric pieces, according to one embodiment.

FIG. 2 illustrates an exemplary block diagram of a computer-vision system for determining joinder points on fabric pieces, according to one embodiment. Computer-vision system 200 can include a camera module 202, an edge finder 204, a curve-computing module 206, a segmentation module 208, a joinder-point-determination module 210, and an output module 212. During operation, camera module 202 can capture images of fabric pieces placed on a work surface. Depending on the application, the fabric pieces can lie flat on the work surface, similar to the example shown in FIG. 1, or the fabric pieces can have different orientations. Camera module 202 can include one or more cameras, including but not limited to: a 2D camera and a 3D camera. A 2D camera can capture 2D imaging information (e.g., red green blue (RGB) images). A 3D camera can capture depth information, in addition to the 2D imaging information.

Edge finder 204 can identify the edges of each fabric piece. Various image-processing techniques can be used. For example, using a machine-learning technique (e.g., by training a neural network), edge finder 204 can learn to determine the edge of a fabric piece. Once an edge is determined, edge finder 204 can mark the edge with a number of points along the edge. For example, edge finder 204 can determine that certain pixels in the image of the fabric pieces correspond to the edge of the fabric piece and can label a subset of the pixels as edge points. The labeling of the edge points can be done using an annotation process. In some embodiments, the system can use light sources with wavelengths outside of the visible light's spectrum for edge detection, to reduce detection noise or for other reasons.

Figure 3A:
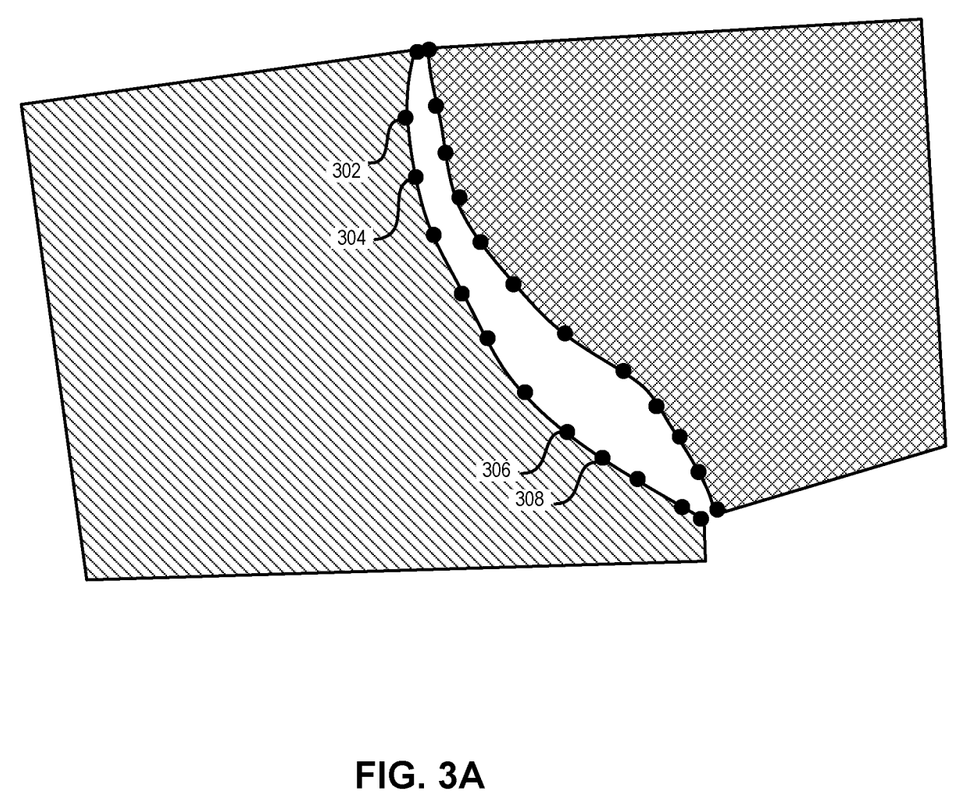
FIG. 3A illustrates exemplary fabric pieces with marked edges, according to one embodiment.

FIG. 3A illustrates exemplary fabric pieces with marked edges, according to one embodiment. In FIG. 3A, the edges points are marked using round dots.

Note that, because edge finder 204 can only determine whether an image pixel is on the edge or not, without knowing the exact shape of the edge, it is hard to control the distance between two adjacent edge points, which define the shape of the edge. Edge finder 204 can place the edge points randomly along each edge, or place the edge points according to a predetermined placement rule. Ideally, if the edge points are placed in such a way that they are equally spaced, then these edge points can be used as joinder points. However, without knowing the exact shape of the curve, it is difficult to accomplish such a goal. In one example, the edge points can be placed to achieve equal spacing along a particular axis (e.g., a vertical or horizontal axis). As can be seen from FIG. 3A, the length of each edge segment (i.e., the segment along the edge between adjacent edge points) is not guaranteed to be a constant. For example, on the edge of the left fabric piece, the segment between edge points 302 and 304 is significantly longer than the segment between edge points 306 and 308. Moreover, because of the differences in length and curvature between the two edges, the way these edge points are distributed on each edge can be significantly different. If one attempts to sew the two fabric pieces together by joining edge points on the left fabric pieces with edge points on the right fabric piece, the resulting garment will have unevenly joined seams.

In one embodiment, edge finder 204 can also have object-tracking capabilities. Once the fabric pieces and their edges are identified, they can be tracked in subsequent frames. As a result, the annotated edge points marking the edges can be bound to the edges of the fabric pieces, even after the fabric pieces are moved to a different location in the camera view or when the camera zooms in or out.

Returning to FIG. 2, based on the edge points identified by edge finder 204, curve-computing module 206 can compute a curve for each edge that fits the shape of the edge. Various curve-fitting or interpolation techniques can be used to compute the curve, including but not limited to: polynomial interpolation, spline interpolation, trigonometric interpolation, etc. In one embodiment, curve-computing module 206 can compute a spline for each edge. Note that a spline is a piecewise polynomial (parametric) curve. Spline interpolation produces smaller errors even with low degree polynomials (e.g., third degree) and can avoid the oscillating problem.

Figure 3B:
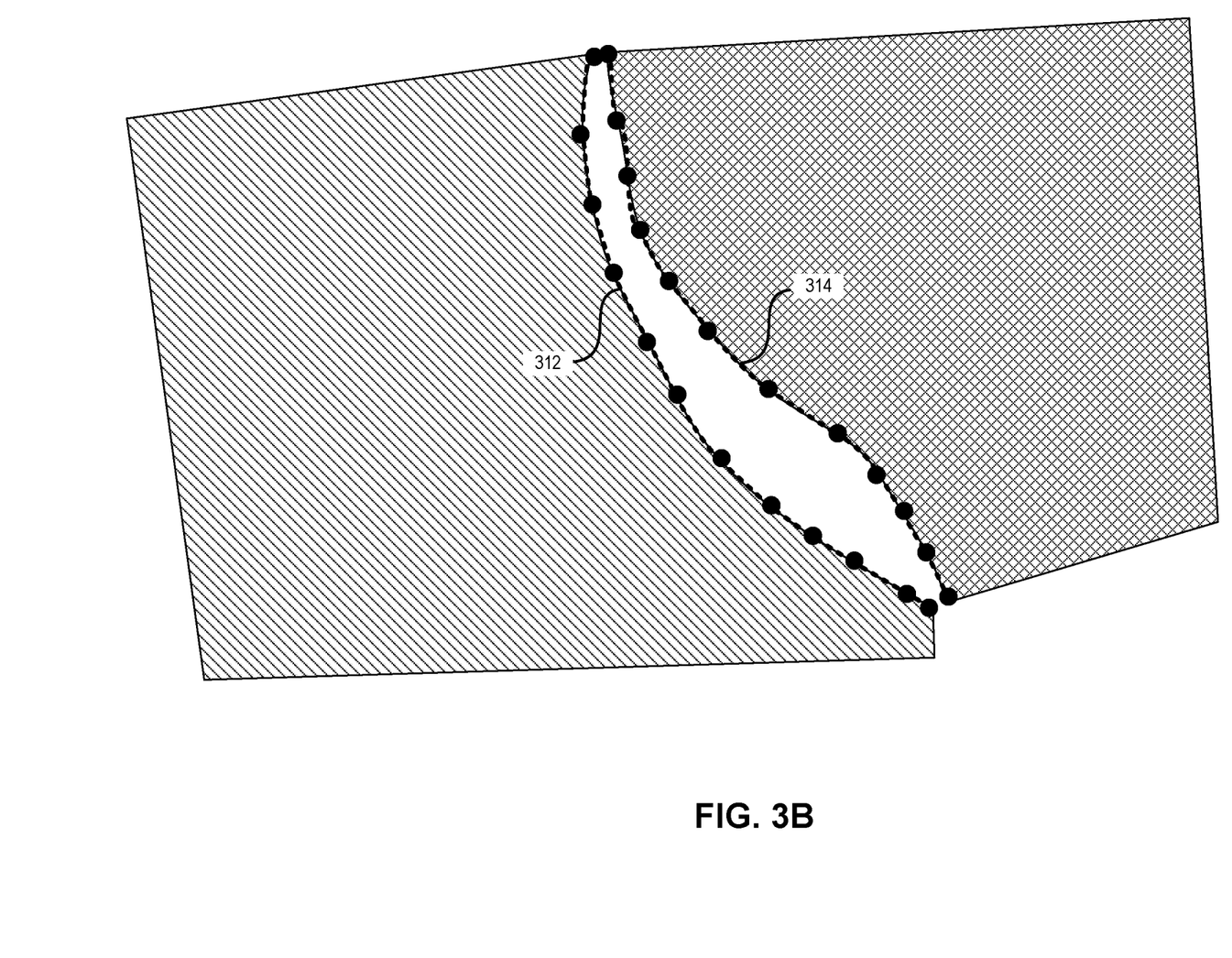
FIG. 3B illustrates exemplary splines computed to fit the edges of the fabric pieces, according to one embodiment.

FIG. 3B illustrates exemplary splines computed to fit the edges of the fabric pieces, according to one embodiment. In FIG. 3B, dashed line 312 indicates a computed spline fitting the edge of the left fabric piece, and dashed line 314 indicates a computed spline fitting the edge of the right fabric piece. In the example shown in FIG. 3B, the number of segments (i.e., polynomial pieces) in each spline is relatively small, and the resulting fitted curve may not be sufficiently smooth. Note that the number of segments may be determined by the number of random edge points identified by edge finder 204. To enhance the smoothness of the fitted curve, the system can increase the number of segments by increasing the number of waypoints (also referred to as knots) that a spline goes through. For example, edge finder 204 can increase the number of points being identified on the detected edge by 10 or even 100 times, or more.

Figure 3C:
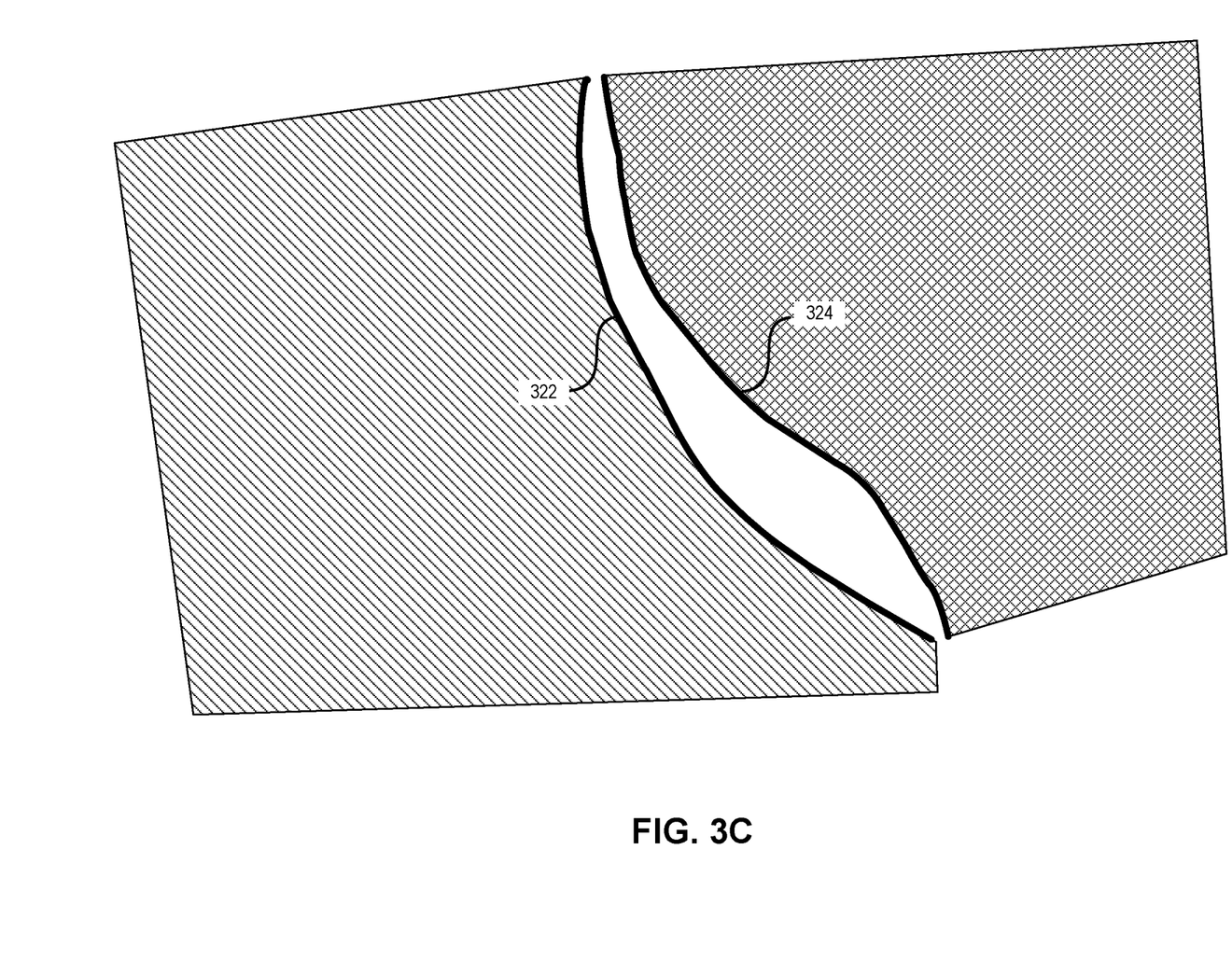
FIG. 3C illustrates exemplary splines with an increased number of segments, according to one embodiment.

FIG. 3C illustrates exemplary splines with an increased number of segments, according to one embodiment. In FIG. 3C, the number of waypoints on each spline (e.g., spline 322 or spline 324) is 100 times what is shown in FIG. 3B, resulting in much smoother curves.

Figure 4:
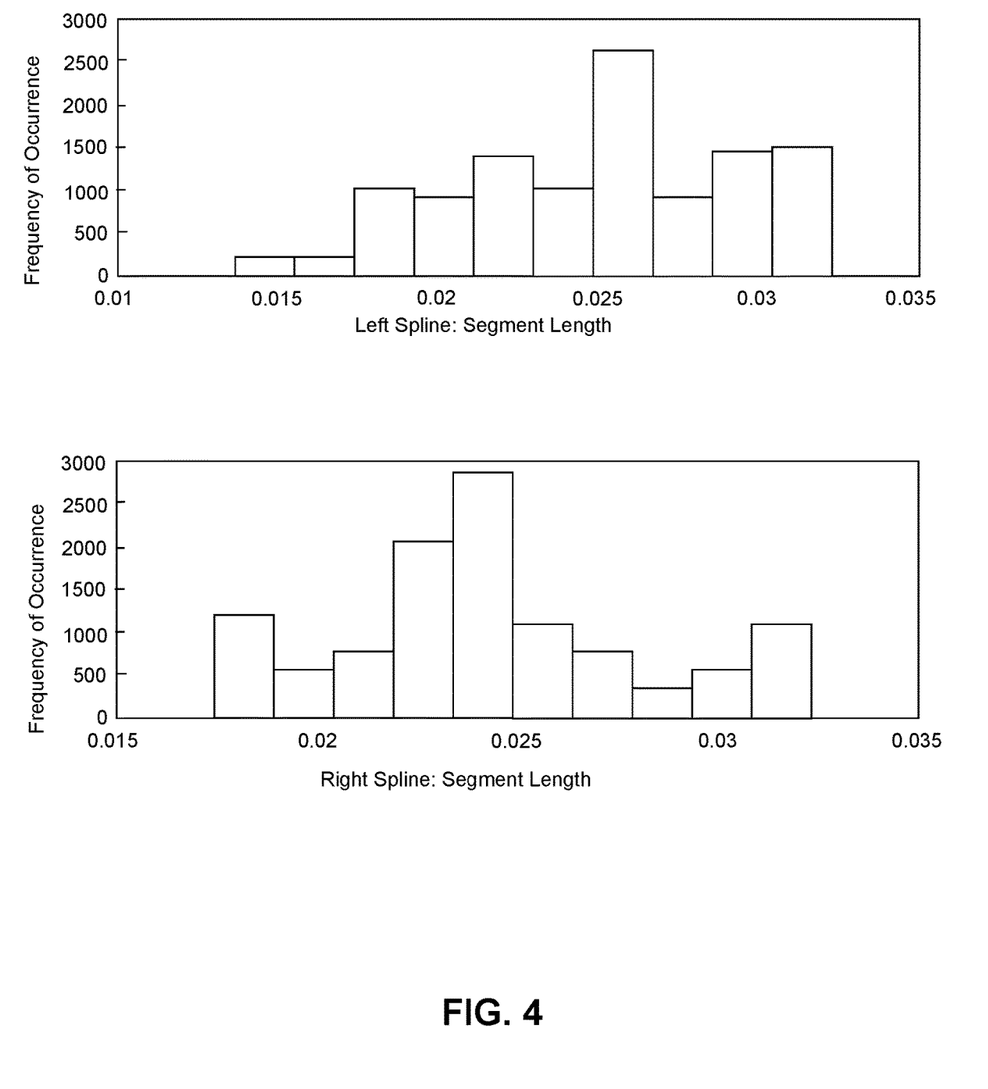
FIG. 4 illustrates a histogram of the segment lengths for the splines shown in FIG. 3C, according to one embodiment.

However, increasing the spatial sampling rate or the number of waypoints on each spline does not solve the non-uniformity problem. The lengths of the segments included in each spline can vary significantly. FIG. 4 illustrates a histogram of the segment lengths for the splines shown in FIG. 3C, according to one embodiment. As shown in FIG. 4, there is a wide range of segment lengths for both splines. In FIG. 4, the length of a segment is expressed using the number of pixels occupied by the segment. The length of the shortest segment can be about 0.016 pixel, whereas the length of the longest segment can be about 0.032 pixel. In other words, the longest segments are about twice the length of the shortest ones. The widely varying segment length means that the knots on the spline cannot be used as joinder points (e.g., fixed stitching locations).

Returning to FIG. 2, segmentation module 208 can compute the lengths of segments between desired joinder points based on a predetermined joinder or stitch pattern. For example, if equally spaced stitches are desired, the length of each segment on a particular spline can be the same. In this case, to calculate the segment length for a particular spline, segmentation module 208 can compute the total length of the spline and then divide the total length of the spline by a predetermined number of segments. To compute the total length of a spline, segmentation module 208 can use an integration technique to compute the length of each polynomial piece and then add all pieces together. To distinguish the segment between joinder points from the segment between knots/waypoints on the spline, the segment between joinder points is also referred to as a joinder segment.

Note that, to prevent the joinder points from being overcrowded or too sparse, segmentation module 208 may also adjust the number of joinder points to be made on a particular garment section. When two fabric pieces are to be joined, one needs to consider the lengths of both splines (e.g., splines 322 and 324 in FIG. 3C), because the number of joinder points on each edge will be the same. The joinder segment length for a longer spline would be longer than that of a shorter spline.

In certain situations, the joinder segments in different sections of a fabric edge can be of different lengths. For example, to achieve a certain drape or fold effect (e.g., in women's dresses), the space between joinder points in one section of an edge may be different from that in another section of the same edge. Based on the specification provided by the garment designer, segmentation module 208 can compute the lengths of all stitch segments along a to-be-sewed edge. In addition to the length and shape of the two fabric pieces, the thickness or weight of the fabric pieces, the material properties of the fabric including how stretchable the fabrics may be, and particular design criteria such as garment draping may be factors used by the segmentation module 208 to determine the appropriate distribution and the number of joinder points appropriate in each situation.

Once the length of each joinder segment is computed, joinder-point-determination module 210 can then locate the joinder points on each edge. This can be done in an iterative manner. In one embodiment, joinder-point-determination module 210 can start from one end of a spline to determine one joinder point at a time until it reaches the other end of the spline. For example, the starting end of a spline can be the first waypoint on the spline, and joinder-point-determination module 210 can compute the length of the polynomial piece between this waypoint and the next waypoint (e.g., using an integration technique). Joinder-point-determination module 210 can then compare this computed length with the previously determined joinder segment length. If the length of the current polynomial piece is less than the joinder segment length, joinder-point-determination module 210 can move to the next waypoint and adds the length of the next polynomial piece to the length of the current polynomial piece. This process repeats itself until the total length of polynomial pieces traversed by joinder-point-determination module 210 is at least equal to the predetermined joinder segment length. Joinder-point-determination module 210 can then identify the current waypoint as the first joinder point. Starting from the first joinder point, joinder-point-determination module 210 can repeat the above process until it finds a second joinder point (i.e., until the total length of polynomial pieces between the first and second joinder points is equal to or just over the predetermined joinder segment length). This process is repeated until the other end of the spline is reached. Because the two splines are different (e.g., the two edges can have different curvatures and lengths), joinder-point-determination module 210 generally can separately determine the joinder points on each spline.

Figure 5A:
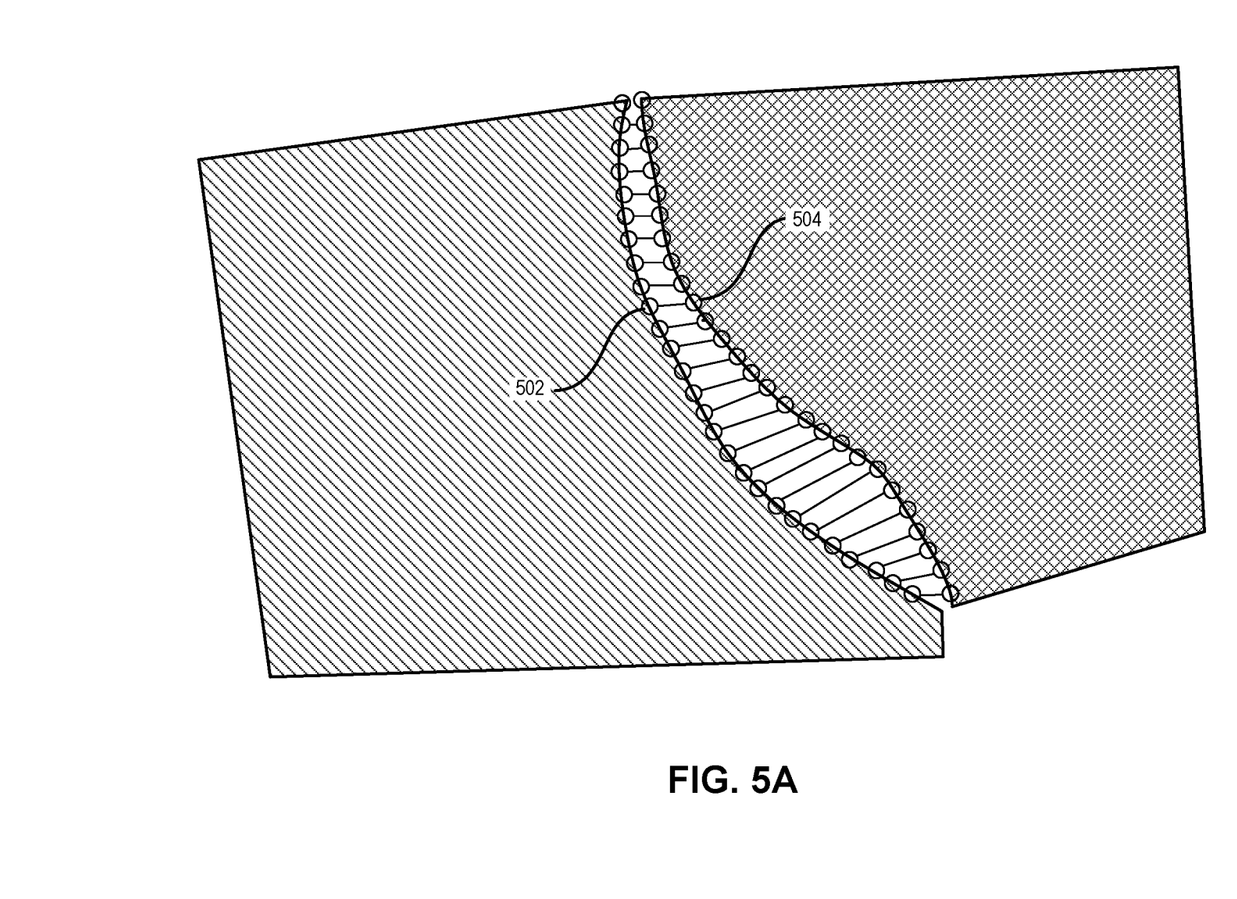
FIG. 5A illustrates exemplary joinder points on edges of fabric pieces, according to one embodiment.

FIG. 5A illustrates exemplary joinder points on edges of fabric pieces, according to one embodiment. Note that the number of joinder points shown in FIG. 5A is much smaller than those used in the actual cases in order to provide a better visual illustration. Moreover, to demonstrate the corresponding relationship between the joinder points on the two edges, FIG. 5A also shows the hypothetical threads binding each pair of joinder points. For example, a thread can connect a joinder point 502 on the edge of the left fabric piece to a corresponding joinder point 504 on the edge of the right fabric piece. In some embodiments, the determined joinder points can also be labeled using an annotation tool. Like the previously mentioned waypoints shown in FIG. 3A, the determined joinder points can be tracked such that they can be correctly identified even when the fabric pieces are moved around in the camera view or when the camera zooms in or out.

Figure 5B:
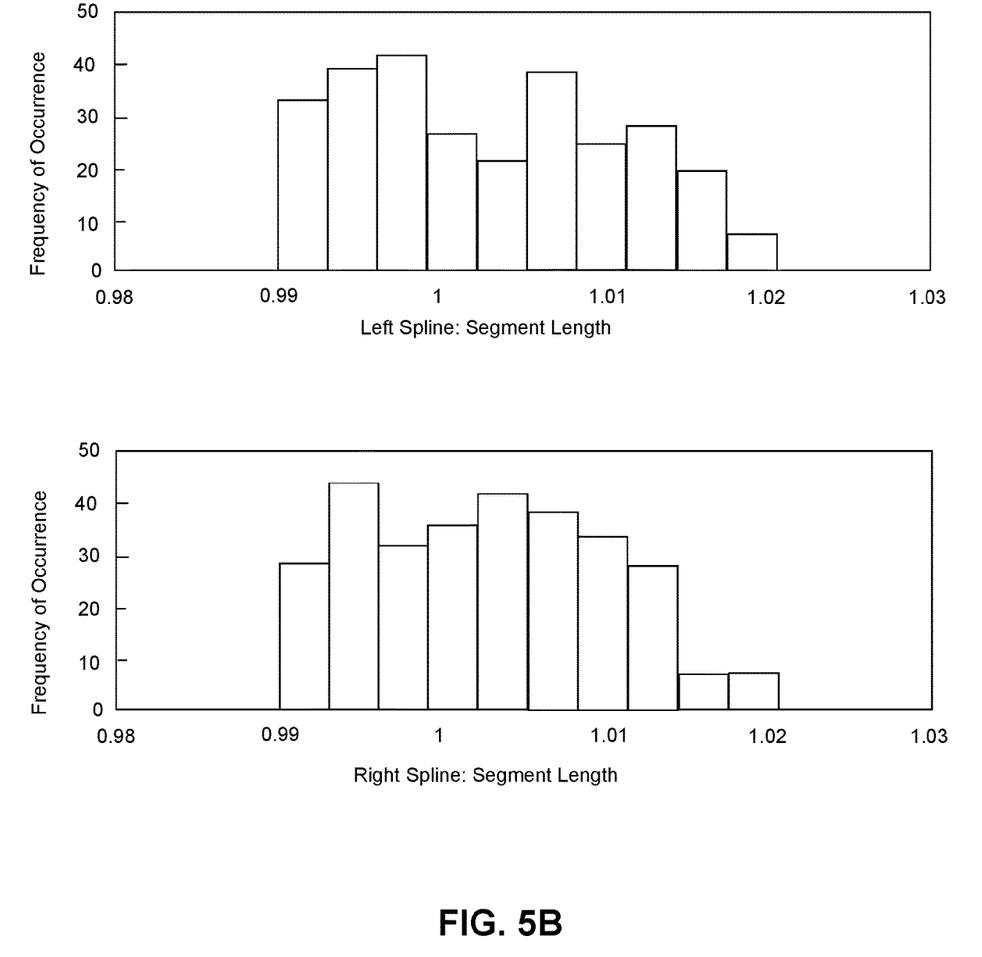
FIG. 5B illustrates a histogram of the joinder segment lengths for the two edges shown in FIG. 5A, according to one embodiment.

In the example shown in FIG. 5A, the joinder points are substantially equally spaced, meaning that the joinder segments on each edge have approximately the same length. FIG. 5B illustrates a histogram of the joinder segment lengths for the two edges shown in FIG. 5A, according to one embodiment. As shown in FIG. 5B, the lengths of the joinder segments vary between 0.99 and 1.02 pixels. There is only approximately 3% variation in the joinder segment length, compared with the 100% variation shown in FIG. 4. The level of variation of the joinder segment length can depend on the spatial sampling rate along the curve. A higher spatial sampling rate can result in a more uniform joinder segment length. In one embodiment, the spatial sampling rate can be selected such that the variance of the length of the joinder segment (i.e., the distance between two consecutive joinder points) can be no more than a predetermined threshold value.

Returning to FIG. 2, once the joinder points on each edge are identified, output module 212 can output the locations (e.g., the pixel coordinates) of the joinder points. Such location information can be used by a robotic control module. The robotic control module can, for example, use this location information to control the feeding of the fabric to an automated sewing system to ensure that a sewing machine attaches the fabric pieces at the determined locations of the joinder points. If other bonding mechanisms are used, such as adhesion, the robotic control module can use the joinder point location information to control the application of adhesives and pressure.

Figure 6:
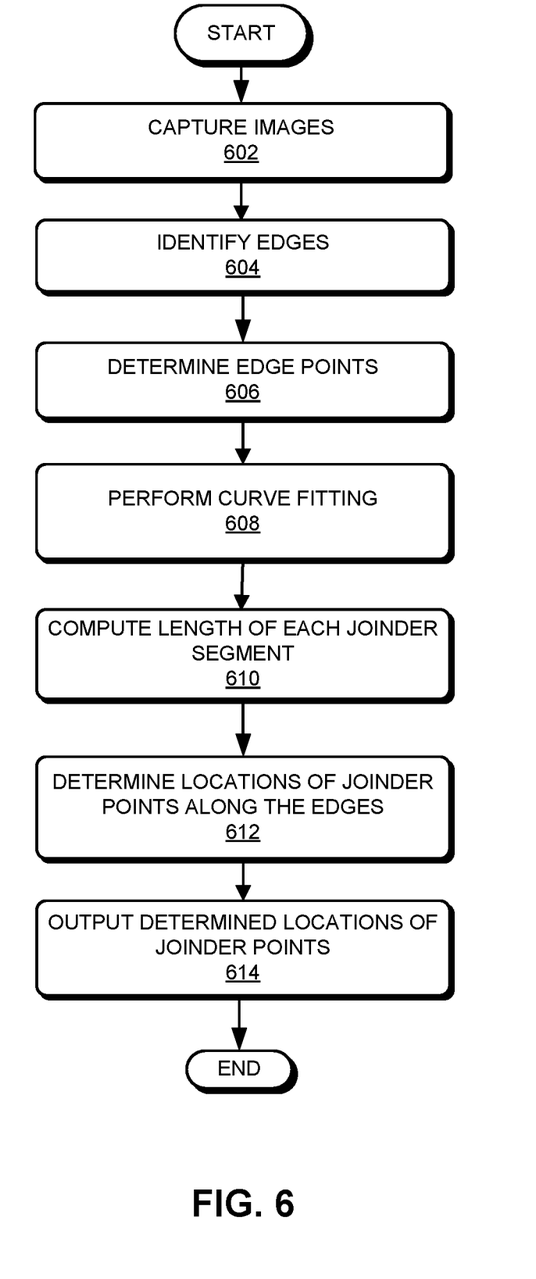
FIG. 6 presents a flowchart illustrating the process for determining joinder points on to-be joined fabric pieces, according to one embodiment.

FIG. 6 presents a flowchart illustrating the process for determining joinder points on to-be joined fabric pieces, according to one embodiment. During operation, a computer-vision system captures one or more images of the to-be-joined fabric pieces (operation 602). The images can be still images or video images. Moreover, the images can include 2D or 3D images.

From the captured images, the computer-vision system can identify the to-be-joined edges on the fabric pieces (operation 604) and determine a number of points on each identified edge (operation 606). Various computer-vision techniques can be used to identify the edges. In one embodiment, a previously trained machine-learning model can be used to identify the edges. The captured image can be fed to the trained model, which can subsequently output the identified edges of the fabric pieces.

The edge points can be determined according to a predetermined rule. The number of edge points can be determined based on the desired resolution. In general, the number of edge points can be significantly larger (e.g., ten times or more) than the number of joinder points.

Based on the determined edge points, a curve-fitting operation can be performed to obtain a curve that fits the shape of each edge (operation 608). In some embodiments, a spline-interpolation technique can be used to compute a spline for each edge. The computed spline can pass all the edge points on the edge. The order of polynomial used in the spline interpolation can be adjusted depending on the resolution requirement. Using higher order polynomials can reduce the amount of fitting errors but may incur a higher computation overhead.

Once the fitted curve is obtained, the system can compute the length of the joinder segment, i.e., the distance between adjacent joinder points (operation 610). In some embodiments, the joinder points are to be equally spaced on each edge. Hence, computing such a length can involve dividing the total length of the fitted curve by a predetermined number of joinder segments. The total length of a spline can be computed by calculating (e.g., using integration) the length of each polynomial piece and computing a sum over all polynomial pieces on the spline. In some cases, on a particular edge, the joinder segment lengths may be different in different sections, depending on the desired effect.

The system can then determine, based on the length of each joinder segment, the location of each joinder point (operation 612). In some embodiments, the system may traverse the polynomial pieces on a spline, one at a time, in order to determine the locations of the joinder points such that the length of each joinder segment is set according to the previously determined length value. This operation is performed for both to-be-joined edges. The system then outputs the determined locations of the joinder points on each edge (operation 614). The location information of the joinder points can be used to guide a robotic system (e.g., a sewing robot) to place stitches (or adhesives) based on the joinder points to join the two fabric pieces together and to achieve the desired joining effect. Note that the computer-vision system can also have object- or feature-tracking capabilities, and the determined locations of the joinder points can be associated with physical locations on the fabric pieces. Therefore, even when the robotic system uses a different computer-vision system with a different viewing angle or field of view, the locations of the joinder points can remain mapped to the corresponding pixel coordinates used by the computer vision of the robotic system, thereby guiding the robotic system to perform the joining operations.

Figure 7:
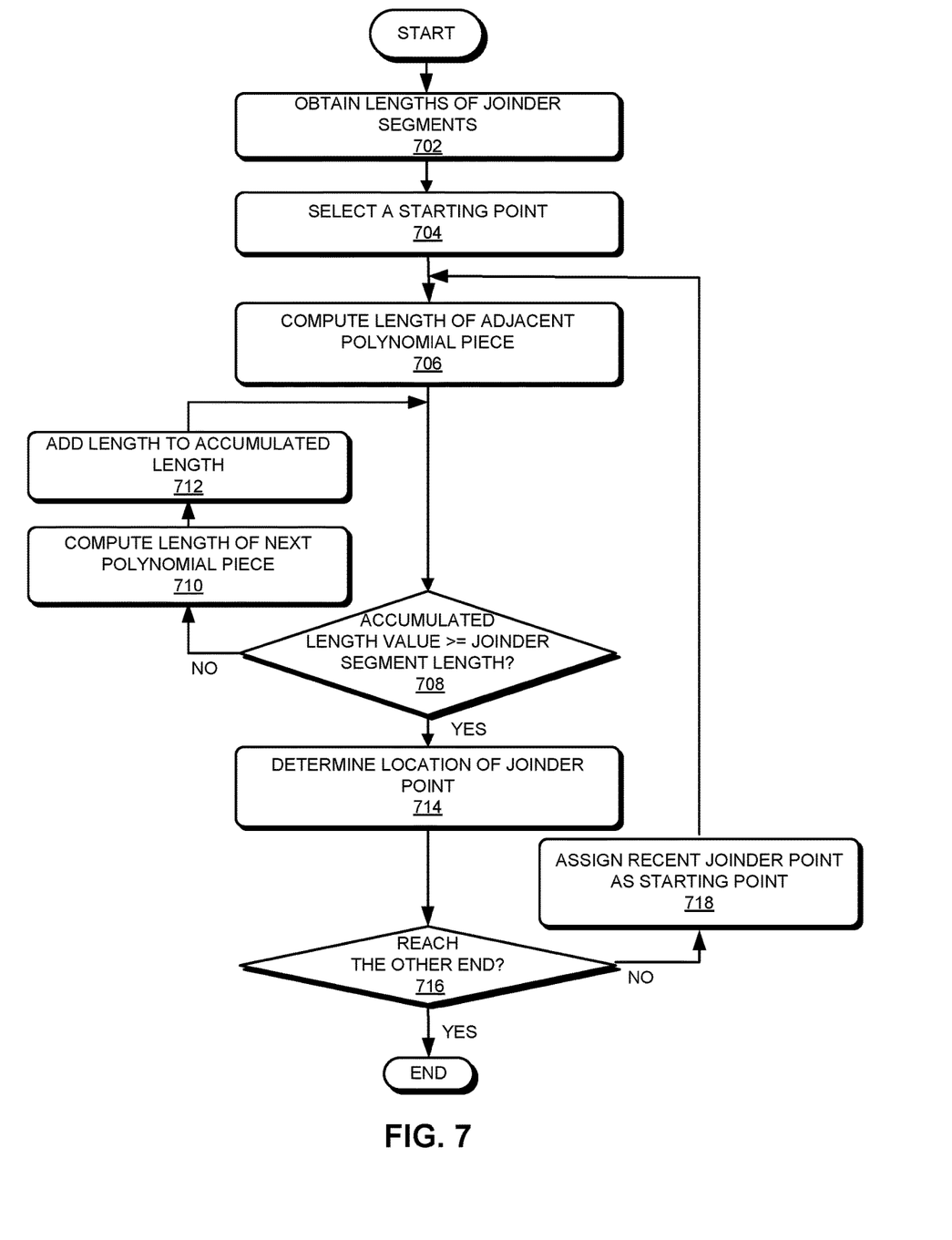
FIG. 7 presents a flowchart illustrating the process for determining locations of joinder points along a spline, according to one embodiment.

FIG. 7 presents a flowchart illustrating the process for determining locations of joinder points along a spline, according to one embodiment. During operation, the system obtains the lengths of individual joinder segments along the edge (operation 702).

The system subsequently selects a starting point on the spline (operation 704). At the beginning, the starting point is an end point of the spline. From the starting point, the system computes the length of an adjacent polynomial piece (operation 706) and determines whether an accumulated length value of the current joinder segment reaches or surpasses the previously determined length value of the joinder segment (operation 708). If not, the system computes the length of a next, adjacent polynomial piece on the spline (operation 710) and adds the length of this polynomial piece to the accumulated length (operation 712), and repeats the comparison process (operation 708). Otherwise, the system determines that the distal end point of this polynomial piece is the location of a joinder point (operation 714) and further determines whether the other end of the spline has been reached (operation 716).

If the other end of the spline is reached, the operation is completed. Otherwise, the system assigns the most recently determined location of the joinder point as the starting point (operation 718) and repeats the process by computing the length of the next adjacent polynomial piece (operation 706). The operations shown in FIG. 7 can work in the scenario where the number of polynomial pieces on the spline is significantly larger than the number of stitches. In situations where the number of polynomial pieces on the spline is comparable or less than the number of joinder points, the system can increase the spatial sampling rate to compute a spline with a greater number of polynomial pieces.

Figure 8:
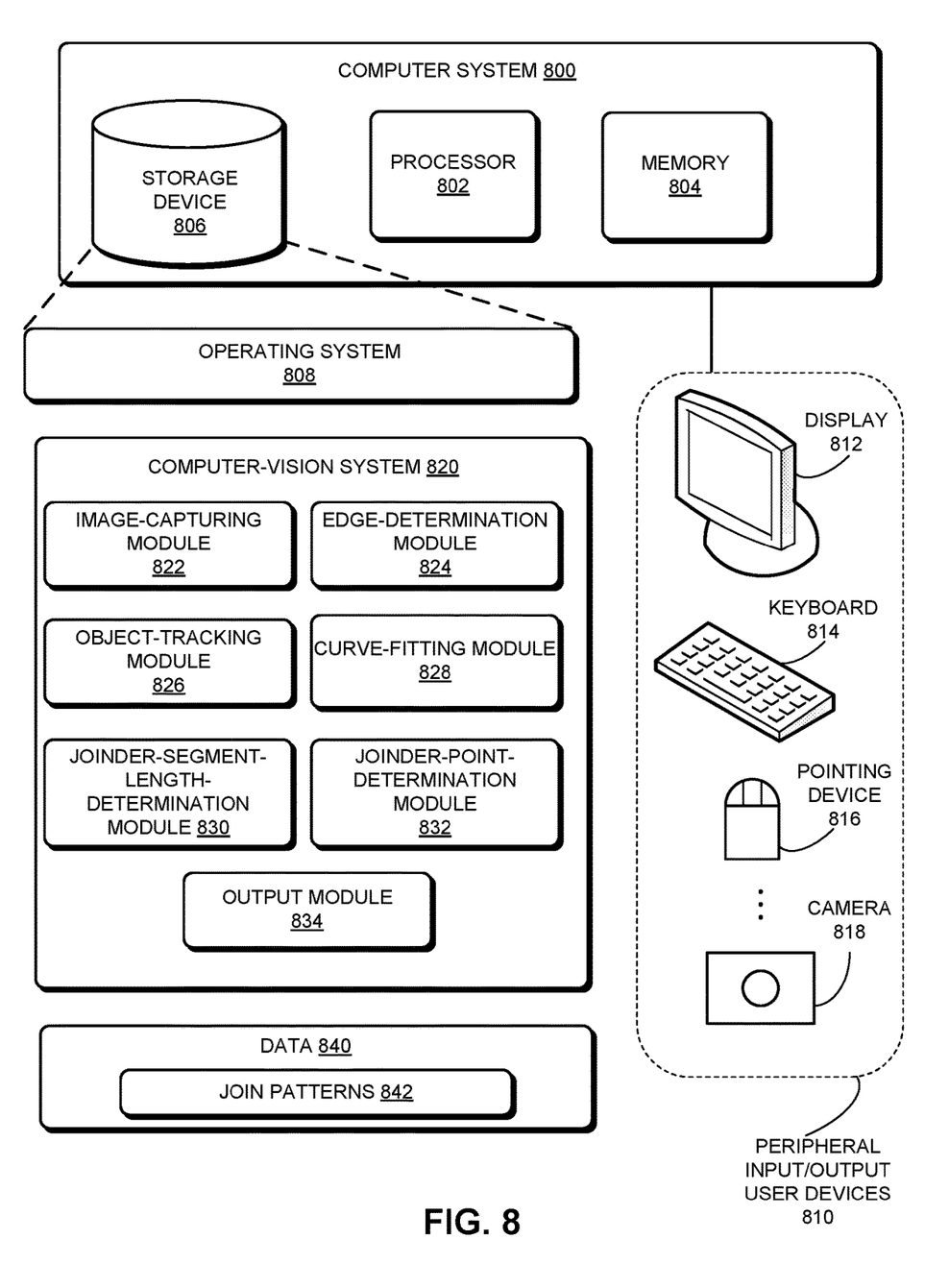
FIG. 8 illustrates an exemplary computer and communication system for facilitating a computer-vision system, according to one embodiment.

FIG. 8 illustrates an exemplary computer system for facilitating a computer-vision system, according to one embodiment. In FIG. 8, computer system 800 can include a processor 802, a memory 804, and a storage device 806. Furthermore, computer system 800 can be coupled to peripheral input/output (I/O) user devices 810, e.g., a display device 812, a keyboard 814, a pointing device 816, and a camera 818. Storage device 806 can store an operating system 808, a computer-vision system 820, and data 840.

Computer-vision system 820 can include instructions, which when executed by computer system 800, can cause computer system 800 or processor 802 to perform methods and/or processes described in this disclosure. Specifically, computer-vision system 820 can include instructions for causing camera 818 to capture images (image-capturing module 822), instructions for determining edges on fabric pieces (edge-determination module 824), instructions for tracking objects in the images (object-tracking module 826), instructions for computing curves that fit the to-be-joined edges (curve-fitting module 828), instructions for determining lengths of individual joinder segments (joinder segment-length-determination module 830), instructions for determining locations of joinder points on the edges (joinder-points-determination module (832), and instructions for outputting the determined joinder-point locations (output module 834). Data 840 can optionally include the designed join patterns 842.

In some embodiments, the various modules in computer-vision system 820, such as modules 822-834 can be partially or entirely implemented in hardware and can be part of processor 802. Further, in some embodiments, the system may not include a separate processor and memory.

In general, the disclosed embodiments provide a computer-vision system that can be used to facilitate automated garment fabrication. More specifically, the computer-vision system can be used to guide the operations of a robotic system when joining two pieces of fabric by determining locations of joinder points on edges of the fabric pieces. The computer-vision system can include one or more cameras capable of capturing images of the fabric pieces. Based on the captured image, the computer-vision system can identify to-be-joined edges and compute a curve (e.g., a spline) for each edge. The computer-vision system can then determine the total length of the edge as well as the length of any joinder segment along the edge, thus facilitating the determination of joinder points based on a predetermined joining pattern. The determined joinder points can be used to guide the robotic system to join the two fabric pieces together by applying stitches or adhesives at the joinder points, thus achieving the desired joining pattern.

The methods and processes described in the detailed description section can be embodied as code and/or data, which can be stored in a computer-readable storage medium. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A piece of garment, produced by:
capturing, by a machine-vision system, an image comprising two to-be-joined fabric pieces;
identifying, by the machine-vision system, a to-be-joined edge on each to-be-joined fabric pieces;
determining a plurality of joinder points on each to-be-joined edge such that variance of distance between two neighboring joinder points on the to-be-joined edge is within a predetermined range; and
joining the to-be-joined fabric pieces at the determined joinder points on each edge.

2. The piece of garment of claim 1, wherein determining the plurality of joinder points comprises computing a curve that substantially fits the to-be-joined edge.

3. The piece of garment of claim 2, wherein computing the curve comprises computing a spline based on a number of points on the to-be-joined edge.

4. The piece of garment of claim 3, wherein computing the spline comprises:
determining the number of points on the to-be-joined edge based on a predetermined spatial sampling rate; and
computing the spline that traverses the determined number of points.

5. The piece of garment of claim 2, wherein determining the joinder points comprises computing a total length of the curve and a segment length between adjacent joinder points.

6. The piece of garment of claim 1, wherein identifying the to-be-joined edge comprises applying a machine-learning technique.

7. The piece of garment of claim 1, wherein producing the garment further comprises tracking the determined joinder points when the fabric pieces are being joined using an automated fabric-joining machine.

8. The piece of garment of claim 1, wherein joining the fabric pieces comprises one or more of: stitching, applying adhesives, and fusing.

9. A computer-vision system for facilitating manufacturing of a garment, comprising:
a camera configured to capture images of to-be-joined fabric pieces;
a processor;
a memory storing instructions that, when executed by the processor, cause the processor to:
identify a to-be-joined edge on each fabric piece; and
determine a plurality of joinder points on the to-be-joined edge such that variance of distance between two neighboring joinder points on the to-be-joined edge is within a predetermined range.

10. The computer-vision system of claim 9, wherein the instructions cause the processor to compute a curve that substantially fits the to-be-joined edge.

11. The computer-vision system of claim 10, wherein computing the curve comprises using a spline-interpolation technique.

12. The computer-vision system of claim 10, wherein the joinder points are determined based on a total length of the curve.

13. The computer-vision system of claim 9, wherein identifying the to-be-joined edge further comprises applying a machine-leaning model.

14. The computer-vision system of claim 9, wherein the instructions cause the processor to output location information of the determined joinder points to an automated fabric-joining machine, thereby facilitating the fabric-joining machine to join the fabric pieces at the determined joinder points.

15. The computer-vision system of claim 9, wherein the instructions cause the processor to track the determined joinder points when the camera's viewing angle changes.

16. A computer-executed method for facilitating manufacturing of a garment, the method comprising:

capturing, by a machine-vision system, an image comprising two to-be-joined fabric pieces;

identifying, by the machine-vision system, a to-be-joined edge on each to-be-joined fabric pieces; and determining a plurality of joinder points on each to-be-joined edge such that variance of distance between two neighboring joinder points on the to-be-joined edge is within a predetermined range.

17. The method of claim 16, wherein determining the plurality of joinder points comprises computing a curve that substantially fits the to-be-joined edge using a spline-interpolation technique.

18. The method of claim 16, wherein identifying the to-be-joined edge comprises applying a machine-learning technique.

19. The method of claim 16, further comprising outputting location information of the determined joinder points to an automated fabric-joining machine, thereby facilitating the automated fabric-joining machine to join the fabric pieces at the determined joinder points.

20. The method of claim 16, further comprising tracking the determined joinder points when a viewing angle of the machine-vision system changes.

\* \* \* \* \*